(12) United States Patent
Blatchley et al.

(10) Patent No.: US 11,358,437 B2
(45) Date of Patent: Jun. 14, 2022

(54) HEAT PUMP SYSTEM AND METHOD FOR OPERATING SAID SYSTEM

(71) Applicant: Ford Global Technologies, LLC, Dearborn, MI (US)

(72) Inventors: Timothy Noah Blatchley, Dearborn, MI (US); Angel Fernando Porras, Dearborn, MI (US); Rohan Shrivastava, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 16/593,671

(22) Filed: Oct. 4, 2019

(65) Prior Publication Data
US 2021/0101445 A1 Apr. 8, 2021

(51) Int. Cl.
*B60H 1/00* (2006.01)
*B60H 1/32* (2006.01)
*B60H 1/22* (2006.01)

(52) U.S. Cl.
CPC ..... *B60H 1/00735* (2013.01); *B60H 1/00007* (2013.01); *B60H 1/00385* (2013.01); *B60H 1/00428* (2013.01); *B60H 1/00907* (2013.01); *B60H 1/2215* (2013.01); *B60H 1/3208* (2013.01); *B60H 1/3213* (2013.01); *B60H 2001/00949* (2013.01); *B60H 2001/3264* (2013.01); *B60H 2001/3267* (2013.01)

(58) Field of Classification Search
CPC ............ B60H 1/00735; B60H 1/00007; B60H 1/00385; B60H 1/00428; B60H 1/00907; B60H 1/3208; B60H 1/3212; B60H 1/2215; B60H 1/0073; B60H 1/32284; B60H 1/00921; B60H 1/3205; B60H 1/2218; B60H 1/00392; B60H 1/004; B60H 2001/3267; B60H 2001/00949; B60H 2001/3264; B60H 2001/3252; B60H 2001/3285; B60H 2001/3283; B60H 2001/00928; B60H 2001/3251; B60H 2001/326; B60H 2001/224
See application file for complete search history.

(56) References Cited

U.S. PATENT DOCUMENTS 9,752,815 B2   9/2017 Saitou et al.
10,124,651 B2  11/2018 Blatchley et al.
10,183,550 B2   1/2019 Gebbie et al.
(Continued)

OTHER PUBLICATIONS

Blatchley, T. et al., "Heat Pump System and Method for Operating Said System," U.S. Appl. No. 16/593,620, filed Oct. 4, 2019, 44 pages.

*Primary Examiner* — Emmanuel E Duke
(74) *Attorney, Agent, or Firm* — David Kelley; McCoy Russell LLP (57) ABSTRACT

Methods and systems are provided for operating a climate control system. In one example, a method for operating a vehicle climate control system includes modeling a pressure in a heat pump downstream of an exterior heat exchanger an upstream of an expansion valve. The method also includes operating the expansion valve to cool a vehicle cabin using the modeled pressure in conjunction with a temperature from a sensor positioned upstream of the expansion valve and downstream of the exterior heat exchanger.

19 Claims, 5 Drawing Sheets

(56) References Cited

U.S. PATENT DOCUMENTS

| | | | |
|---|---|---|---|
| 2003/0055603 A1* | 3/2003 | Rossi | F25B 49/02 |
| | | | 702/185 |
| 2004/0144106 A1* | 7/2004 | Douglas | F25B 49/02 |
| | | | 62/127 |
| 2006/0204368 A1 | 9/2006 | Imai et al. | |
| 2010/0229577 A1* | 9/2010 | Hong | F28F 1/08 |
| | | | 62/190 |
| 2013/0306039 A1* | 11/2013 | Zagone | F02B 37/162 |
| | | | 123/562 |
| 2015/0059367 A1* | 3/2015 | Emo | F25B 45/00 |
| | | | 62/77 |
| 2015/0183296 A1 | 7/2015 | Ragazzi | |
| 2016/0121691 A1* | 5/2016 | Liu | B60H 1/3213 |
| | | | 62/115 |
| 2017/0240024 A1* | 8/2017 | Blatchley | B60H 1/00921 |
| 2018/0094843 A1* | 4/2018 | Connell | F25B 43/006 |
| 2019/0366800 A1* | 12/2019 | Durrani | B60H 1/00021 |

* cited by examiner

HEAT PUMP SYSTEM AND METHOD FOR OPERATING SAID SYSTEM

FIELD

The present description relates generally to methods and systems for vehicle cabin climate control.

BACKGROUND/SUMMARY

Vehicles have incorporated cabin climate control systems with, for example, heater cores and air conditioning devices, to achieve desired cabin conditioning set-points. Heat pump systems have also been incorporated into vehicles to more efficiently heat and cool the cabin. Heat pump systems may be particularly beneficial in plug-in vehicles such as battery electric vehicles (BEVs) where energy conservation is desirable. Heat pumps can, for example, increase a vehicle's range when compared to systems using solely electrically operated heaters for cabin heating and separate air conditioning (A/C) loops for cabin cooling. However, vehicles may experience inefficient climate control energy management stemming from the heat pump control strategies employed in the vehicle.

One example approach of incorporating a heat pump in a vehicle is shown by Imai et al., in U.S. 2006/0204368 A1. Imai discloses a system using a number of sensor inputs such as an input from a temperature sensor at an outlet of an evaporator, high pressure refrigerant pressure sensors, etc., to control a compressor to achieve a targeted pressure differential across the compressor.

However, the inventors have recognized several potential drawbacks with Imai's system. For example, Imai's system increases compressor speed when more power is made available in the engine, something that is not applicable to BEVs. Furthermore, in Imai's system a number of sensors inputs are used in feedback control strategies for PTC and heat pump operation. The sensors may be costly and therefore increase the manufacturing cost and complexity of the vehicle system. Other vehicle heat pump systems have also come up short of achieving production cost and system efficiency goals.

To address at least some of the abovementioned problems, a method for operating a vehicle climate control system is provided that comprises modeling a pressure in a heat pump circuit downstream of an exterior heat exchanger an upstream of an expansion valve. The method also includes operating the expansion valve in the heat pump circuit to cool a vehicle cabin based on the modeled pressure and a temperature from a sensor positioned upstream of the expansion valve and downstream of the exterior heat exchanger. In this way, a pressure in the heat pump system may be modeled during, for example, cooling mode operation. Consequently, the use of a pressure sensor located at the outlet of the exterior heat exchanger can be forgone, if desired. As a result, system costs are reduced.

In one example, the pressure may be modeled by determining a pressure drop across the heat exchanger using a pressure from a pressure sensor positioned upstream of the exterior heat exchanger, a speed of a compressor in the heat pump circuit, and/or an ambient temperature. In this way, available heat pump system data can be used to accurately model the pressure gradient across the exterior heat exchanger and accurately control the expansion valve based on the pressure model. Accurate expansion valve control may lead to more accurate cabin climate control as well as increased system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
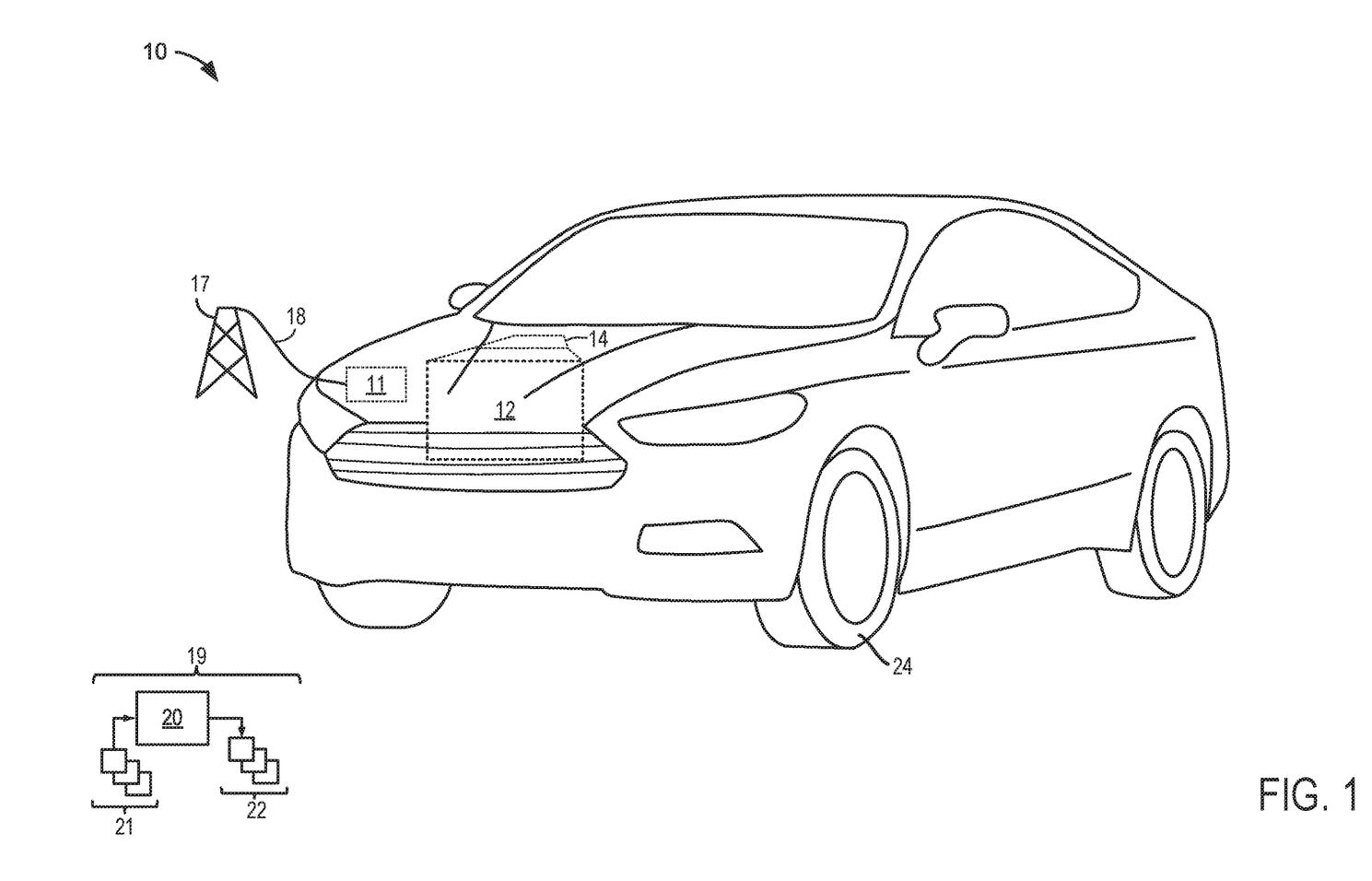
FIG. 1 shows a schematic depiction of a vehicle.
Figure 2:
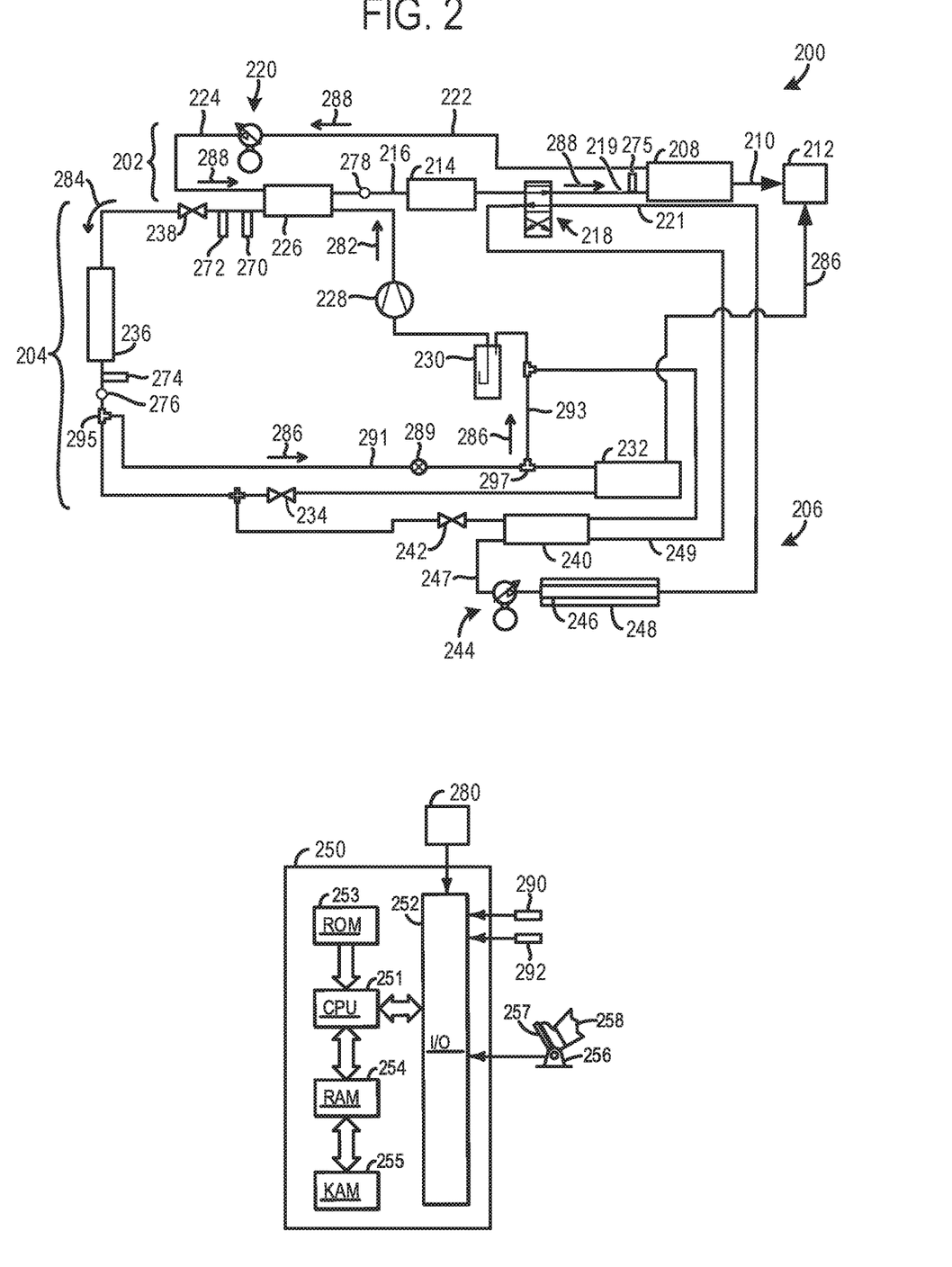
FIG. 2 shows a climate control system for a vehicle operating in a heating mode.
Figure 3:
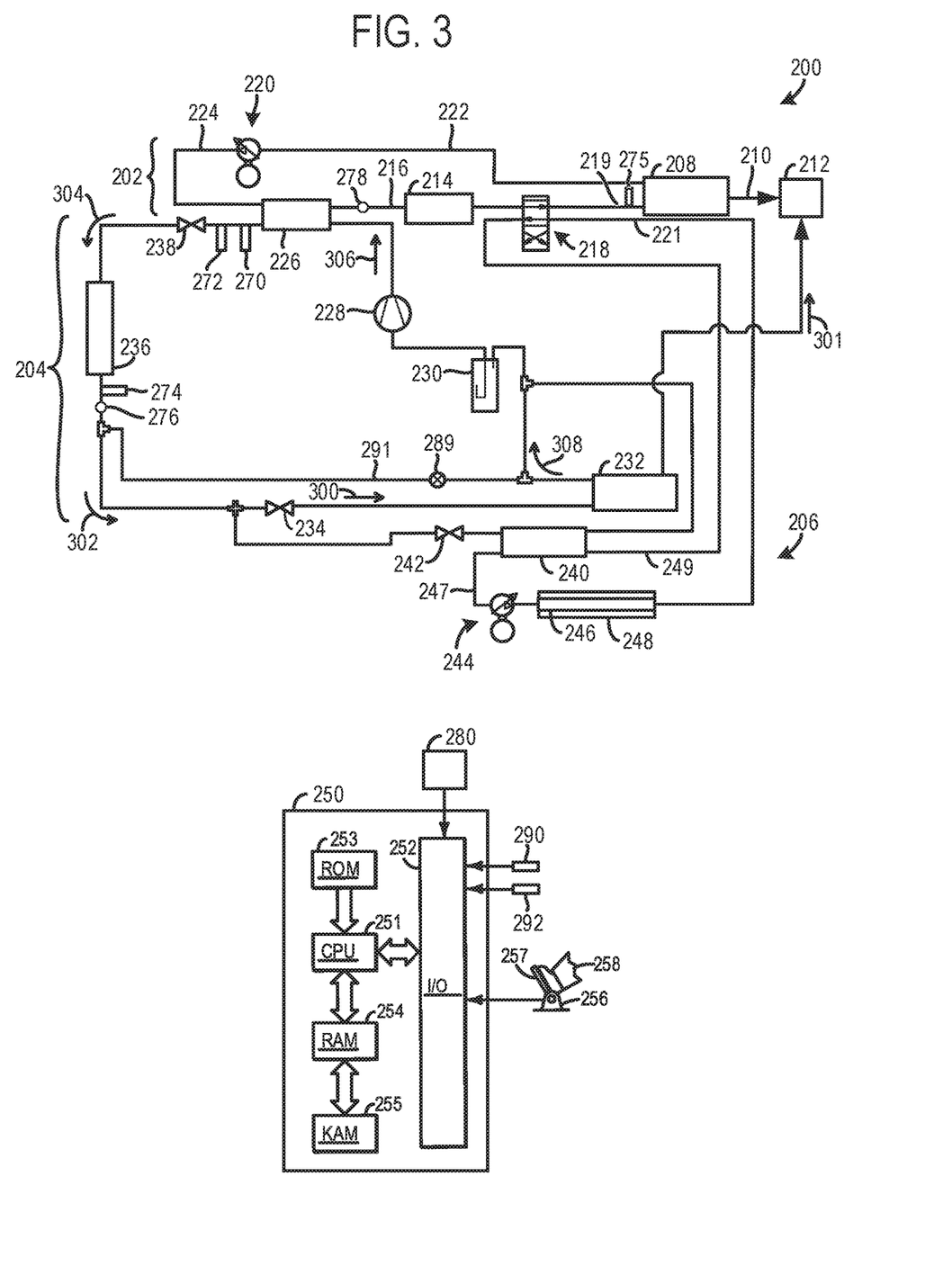
FIG. 3 shows the climate control system, depicted in FIG. 2, operating in a cooling mode.
Figure 4:
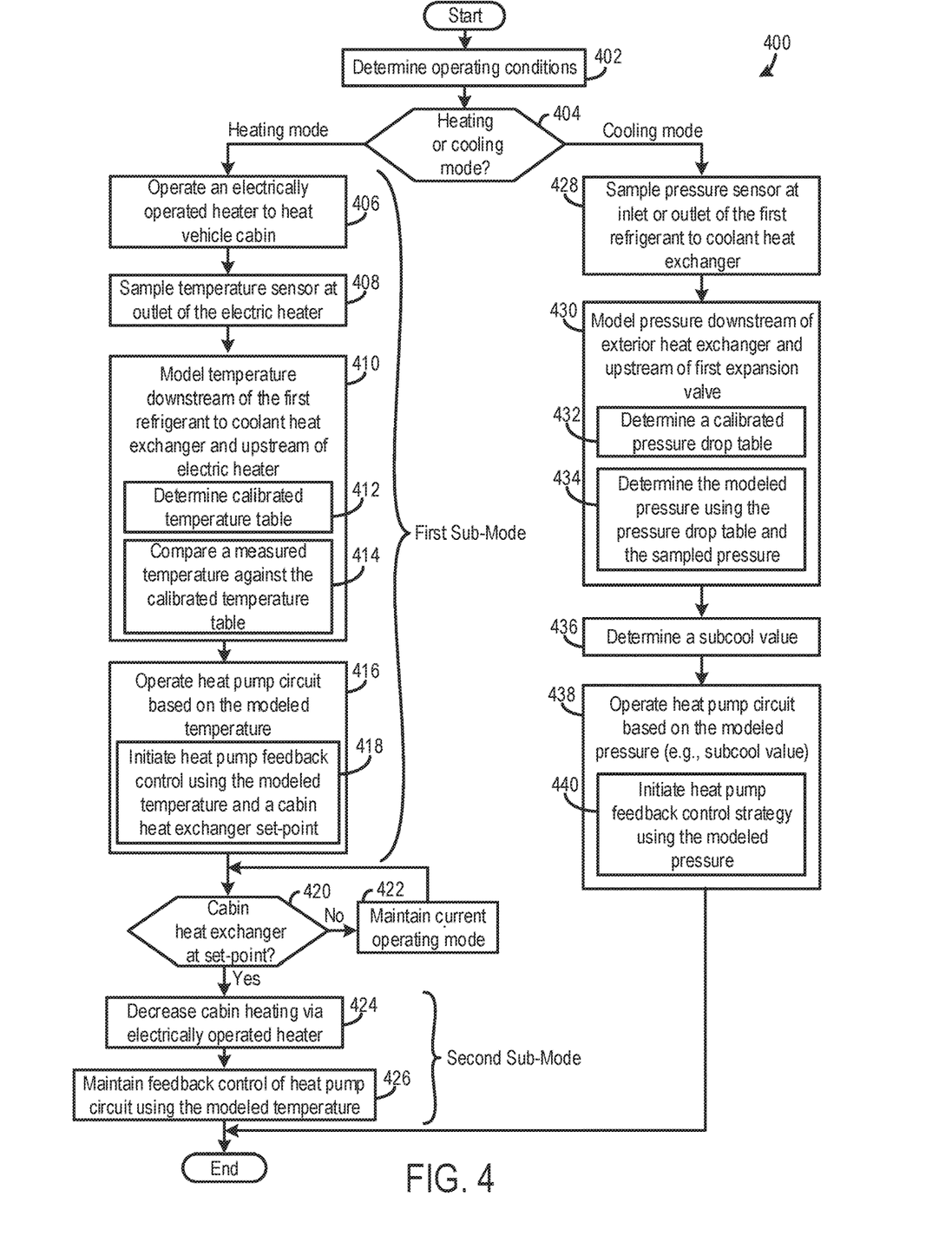
FIG. 4 shows a method for operation of a climate control system.
Figure 5:
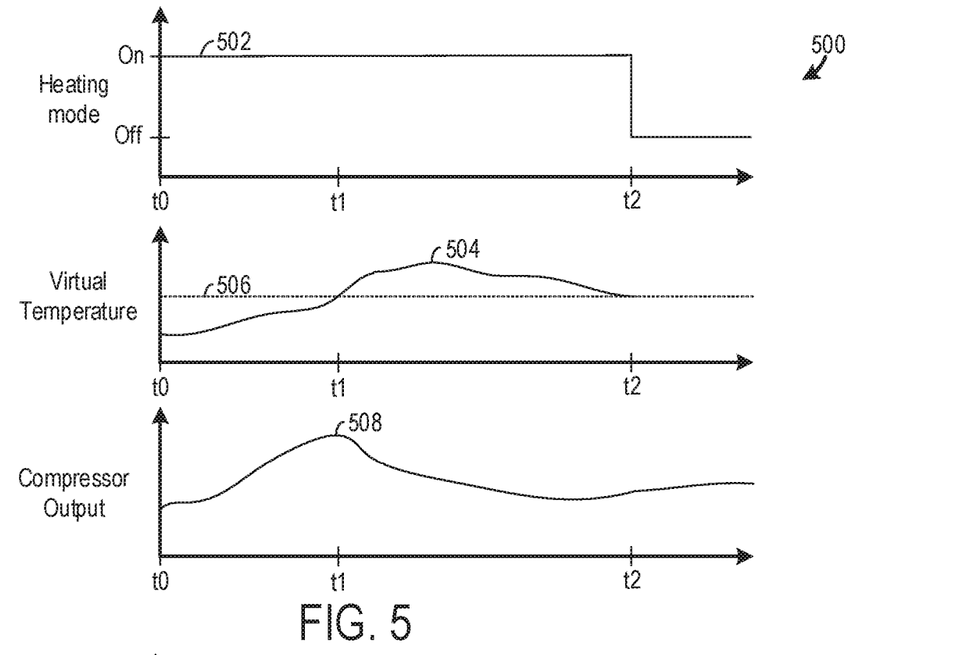
FIGS. 5 and 6 illustrate use-case timing diagrams for climate control system operating methods.
Figure 6:
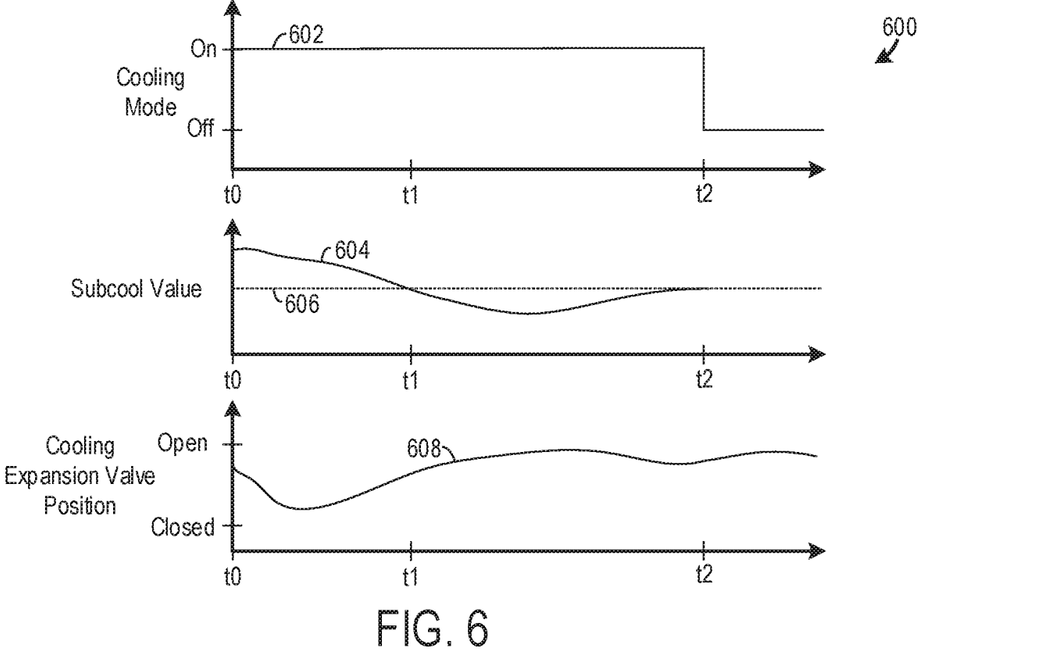

A vehicle climate control system designed to efficiently operate in both heating and cooling modes using modeled temperatures and/or pressures is described herein. The vehicle may be a passenger vehicle as is shown in FIG. 1 or a commercial vehicle (not shown). FIGS. 2 and 3 show an example of a climate control system operating in different modes using modeled temperatures and pressures. FIG. 4 shows a method for efficient control of a climate control system in a cooling mode using a modeled pressure and a heating mode using a modeled temperature. FIGS. 5 and 6 show use-case graphical representations of the methods for modal vehicle system control.

Referring to FIG. 1, a vehicle 10 including an internal combustion engine 12, an electric motor 14, and an energy storage device 16 is shown. The engine 12 may include cylinders, valves, etc., to enable the engine to implement a combustion process (e.g., four stroke combustion process) for motive power generation. The electric motor 14 is designed to generate motive power using energy from the energy storage device 16 and may include rotors, stators, etc., for power generation. A drive wheel 24 in the vehicle 10 may receive rotational energy generated via the engine 12 and/or electric motor 14 to propel the vehicle along a drive surface (not shown). The drive wheel is illustrated as a front wheel, however powertrain configurations such as two-wheel drive, rear wheel drive, four wheel drive, etc., have been envisioned.

In one example, the vehicle 10 may harness motive energy from both the engine 12 and the electric motor 14 and therefore may be referred to as a hybrid electric vehicle. Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions.

In other examples, the vehicle may include only electric motor 14 for propulsion and therefore may be referred to as a battery electric vehicle (BEV). The electric motor 14 may be supplied with electrical power via the energy storage device 11 (e.g., battery, capacitor, flywheel, etc.) Energy storage device may be recharged from an external energy source such as a stationary electrical power grid 17 (e.g., home or remote charging station), a portable energy source, solar charging station, etc., via electrical plug 18, capacitive charging, etc.

The engine 12 and/or electric motor 14 may be controlled at least partially by a control system 19 including controller 20. Controller 20 may receive various signals from sensors 21 coupled to the engine 10 and/or electric motor 14 and send control signals to various actuators 22 coupled to the engine, motor, and/or vehicle to enable output of the engine and/or motor to be adjusted as desired.

FIGS. 2 and 3 show a climate control system 200. It will be understood that the climate control system 200 illustrated in FIG. 2 may be included in the vehicle 10 shown in FIG. 1, or other suitable vehicles. As such, the vehicle 10, shown in FIG. 1, may include common components, functionality, etc., with the system shown in FIGS. 2 and 3 or vice versa. As such, the energy storage device 248, shown in FIGS. 2 and 3 is an example of the energy storage device 11, shown in FIG. 1, the controller 250 may be an example of the controller 20, shown in FIG. 1, etc.

The climate control system 200 includes a cabin heating circuit 202, heat pump circuit 204, and an energy storage device cooling circuit 206. However, other system configurations have been contemplated with additional or alternate cooling and/or heating loops, additional or alternate coolant and/or refrigerant routing, etc. The working fluid in the heat pump circuit 204 may be refrigerant. On the other hand, the working fluid in the cabin heating circuit 202 and the energy storage device cooling circuit 206 may be a suitable coolant such as a mixture of water and glycol, a waterless coolant, etc. As described herein, a circuit is a grouping of conduit(s), line(s), pump(s), valve(s), heat exchanger(s), etc., routing a working fluid (e.g., refrigerant, coolant, etc.) along a desired path.

The cabin heating circuit 202 includes a cabin heat exchanger 208 (e.g., heater core). The cabin heat exchanger 208 is designed to transfer heat, indicated via arrow 210, to a vehicle cabin 212. For instance, the cabin heat exchanger 208 may heat air in a ventilation system directing the heated air into the vehicle cabin. The cabin heat exchanger 208 and/or the other heat exchangers described herein may include conduits, fins, housings, etc., to accomplish the heat transfer functionality.

The cabin heating circuit 202 may further include an electrically operated heater 214 (e.g., resistance heater, a positive temperature coefficient (PTC) heater, thermoelectric heater (e.g., Peltier heater, etc.) The electrically operated heater 214 may heat coolant flowing through the conduit 216 during certain operating conditions. The heater 214 is shown positioned downstream of the first refrigerant to coolant heat exchanger 226. By arranging the heater 214 downstream of the heat exchanger 226 the vehicle cabin may be quickly warmed up using both devices and then the heat pump may subsequently take over cabin heating operation when it has achieved a desired operating state. In this way, the cabin can be first rapidly heated and then the system may be more efficiently operated subsequent to the rapid cabin warm-up. However, other arrangements of the heater 214 and the heat exchanger 226 have been contemplated.

The cabin heating circuit 202 may further include a valve 218 that may provide fluidic coupling between the cabin heating circuit 202 and the energy storage device cooling circuit 206, during some conditions, and inhibit coolant flow between the cabin heating circuit 202 and the energy storage device cooling circuit 206, during other conditions. Thus, the valve 218 during some conditions may provide fluidic coupling between an outlet of the electrically operated heater 214 and an inlet of the cabin heat exchanger 208 via coolant line 219. However, during other conditions the valve 218 may provide fluidic coupling between the outlet of the electrically operated heater 214 and coolant conduit 221 in the energy storage device cooling circuit 206. It will be understood that the valve 218 and the other valves described herein may be arranged in a various configuration to permit and block working fluid flow there through. Additionally, the valves may also be arranged in flow configurations between opened and closed (e.g., partially opened or partially closed) where a desired amount of working fluid (e.g., coolant, refrigerant, etc.) is provided to downstream devices, components, etc.

The cabin heating circuit 202 may also include a pump 220 designed to adjust coolant flow through the circuit. For instance, the pump 220 may increase or decrease coolant flow through the cabin heating circuit 202 based on engine operating conditions. The pump 220 as well as the other pumps described herein may include pistons, housings, chambers, rotors, etc., to accomplish said coolant flowrate adjustment. Moreover, the pump 220 as well as the other pumps described herein may be electrically driven. However, mechanically driven pumps have been envisioned when the system is included in a hybrid vehicle with an engine. A coolant conduit 222 provides fluidic coupling between an inlet of the pump 220 and the cabin heat exchanger 208. Another coolant conduit 224 provides fluidic coupling between an outlet of the pump 220 and a first refrigerant to coolant heat exchanger 226.

The first refrigerant to coolant heat exchanger 226 provides heat transfer between the cabin heating circuit 202 and the heat pump circuit 204, when in operation. It will be understood that the first refrigerant to coolant heat exchanger 226 as well as the other refrigerant to coolant heat exchangers described herein may fluidly isolate coolant and refrigerant flowing there through but enable heat transfer between the coolant and the refrigerant.

The heat pump circuit 204 may include the first refrigerant to coolant heat exchanger 226 along with a compressor 228, an accumulator 230, an evaporator 232, a first expansion valve 234 (e.g., cooling expansion valve), an exterior heat exchanger 236, and a second expansion valve 238 (e.g., heating expansion valve). The compressor 228 is designed to increase the pressure of the refrigerant flowing there through and may include a housing, rotor, vanes, other suitable components, etc., to achieve the refrigerant pressurization. The accumulator 230, when in operation, may act as a reservoir for storing residual liquid refrigerant so that vapor refrigerant rather than liquid refrigerant may be provided to the compressor 228. The accumulator 230 may include a desiccant that absorbs small amounts of water moisture from the refrigerant, in some embodiments.

The second expansion valve 238 may control the amount of refrigerant (e.g., superheat) delivered to the exterior heat exchanger 236. Additionally, the first expansion valve 234 may control the amount of refrigerant (e.g., subcool) delivered to the evaporator 232. The first expansion valve 234 and the other expansion valves herein may include springs, temperature sensors, orifices, etc., to accomplish the refrigerant metering.

The heat pump circuit 204 may further include a second coolant to refrigerant heat exchanger 240. The second coolant to refrigerant heat exchanger 240 may when in operation, transfer thermal energy between the refrigerant in the heat pump circuit 204 and the energy storage device cooling circuit 206. An expansion valve 242 meters the amount of refrigerant delivered to the second coolant to refrigerant heat exchanger 240.

The energy storage device cooling circuit 206 includes a pump 244, an energy storage device cooler 246 coupled to or otherwise integrated into an energy storage device 248, a coolant conduit 249 routing coolant through the second refrigerant to coolant heat exchanger 240, in the illustrated example. However, other suitable energy storage device cooling circuit arrangements have been envisioned. The energy storage device cooler 246 may include conduits, passages, etc., allowing coolant to be routed through the energy storage device, across the housing of the energy storage device, etc. The coolant conduit 221 also extends between the energy storage device cooler 246 and the valve 218. Another coolant conduit 247 also extends between the second refrigerant to coolant heat exchanger 240 to an inlet of the pump 244.

FIGS. 2 and 3 also show a controller 250 in the vehicle climate control system 200. Specifically, controller 250 is shown in FIGS. 2 and 3 as a conventional microcomputer including: microprocessor unit 251, input/output ports 252, read-only memory 253, random access memory 254, keep alive memory 255, and a conventional data bus. However, numerous controller arrangements have been envisioned.

The controller 250 may be configured to trigger one or more actuators and/or send commands to components. For instance, the controller 250 may trigger adjustment of the valve 218, pump 220, compressor 228, expansion valve 234, expansion valve 238, expansion valve 242, pump 244, valve 289, and/or electrically operated heater 214. Specifically in one example, the controller 250 may send signals to an actuator in the pump 220 to induce adjustment (e.g., increase or decrease) in coolant flow. The other adjustable components receiving commands from the controller may also function in a similar manner. Therefore, the controller 250 receives signals from the various sensors and employs various actuators to adjust system operation based on the received signals and instructions stored in memory (e.g., non-transitory memory) of the controller. As another example, the controller 250 may make a logical determination regarding a positon of an actuator in a commanded component based on logic rules that are a function of a parameter (e.g., coolant temperature, refrigerant pressure, etc.) The controller may then generate a control signal that is sent to the actuator. The control signal, for instance, may be generated using a look-up table indexed to operating conditions. However, other suitable schemes for determining the make-up of control signals sent to actuators in controllable components have been envisioned.

The controller 250 may also receive signals from sensors in the climate control system 200 and/or engine 12, shown in FIG. 1. The sensors providing input into the controller may include a pressure sensor 270, a temperature sensor 272, a temperature sensor 274, temperature sensor 275, ambient temperature sensor 290, and/or ambient pressure sensor 292. Additionally, the controller 250 is also configured to receive a pedal position from a pedal position sensor 256 couples to a pedal 257 actuated by an operator 258.

A possible location of a modeled pressure, discussed in greater detail herein is indicated at 276. Additionally, a potential location of a modeled temperature discussed in greater detail herein is indicated at 278. However, it will be understood that the pressures and/or temperatures may be modeled at additional or alternate suitable locations in the system. It will be appreciated that when the temperature and pressure are modeled sensors may be omitted from the system at those locations, thereby reducing system costs. It will also be appreciated that the controller 250 may determine the occurrence of different events, conditions, etc., from the sensor inputs. Additionally, the controller 250 may receive cabin heating/cooling requests from an input device 280. The input device may be a control panel in the vehicle cabin, a portable computing device, etc. For example, a user may interact with the control panel (e.g., a temperature knob, slider, touch interface, combinations thereof, etc.) to set the cabin at a desired temperature and set the system to output a targeted amount of cabin cooling or heating. In this way, a vehicle driver, passenger, etc., can request cabin heating or cooling. In other examples, the cabin temperature set-point may be adjusted according to a predetermined schedule. Additionally, controller 250 may be programmed with computer readable data representing instructions executable to perform the methods, controls schemes, etc., described below as well as other variants that are anticipated but not specifically listed.

It will be understood that the controller 250 is designed to operate the climate control system 200 in different modes. FIG. 2 specifically shows a first operating mode (e.g., heating mode) of the climate control system 200. In the first operating mode, coolant is heated via the heat pump circuit 204 and then heated coolant is transferred to the cabin heat exchanger 208. Specifically, in the illustrated example, the heat pump circuit 204 is operated to flow refrigerant from the compressor 228 to the first refrigerant to coolant heat exchanger 226, indicated via arrow 282. The first refrigerant to coolant heat exchanger 226 transfers thermal energy from the refrigerant to coolant in the cabin heating circuit 202. Refrigerant is flowed through the expansion valve 238 and then to the exterior heat exchanger 236, indicated at arrow 284, where thermal energy is transferred from the refrigerant to the surrounding environment. Refrigerant is then routed from the exterior heat exchanger to the accumulator 230 for the compressor 228, bypassing the evaporator 232, indicated via arrows 286. However, other refrigerant routing schemes for the heating mode has been contemplated.

A valve 289 (e.g., shut-off valve) is shown positioned in the conduit 291. Additionally or alternatively, a valve (not shown) may be positioned in the conduit 293. Thus, the valve 289 is positioned between the junction 295 and junction 297. The climate control system 200 is shown including other junctions that are not specifically labelled. The junctions in the system 200 function to allow fluid flow from different conduits to merge and may include housings, sections, etc., to accomplish the flow merging functionality. Additionally, the system is also shown including conduits extending between the junctions and other components that are not specifically labelled. The conduits function to allow fluid to flow between the components and may include housings, interior flow channels, etc., to accomplish the fluid transport functionality. The valve 289 may be operated to restrict the flow of refrigerant through the conduit 291, during certain operating conditions. Restricting the flow through the conduit 291 via the valve 289 reduces the chance (e.g., prevents) refrigerant from bypassing valve 234 and/or expansion valve 242 through conduit 291 and back to the compressor when flow is desired through the valve 234 and/or expansion valve 242.

In the cabin heating circuit 202, in the heating mode, the pump 220 is operated to flow coolant through the first refrigerant to coolant heat exchanger 226, through the electrically operated heater 214, through the valve 218, to the cabin heat exchanger 208, and then returning to an inlet of the pump 220, indicated via arrows 288. In this way, the coolant travels in a loop to deliver heated coolant to the cabin heat exchanger 208 (e.g., heater core) to facilitate cabin heating. It will be understood that the electrically operated heater 214 during some conditions, may be activated during the heating mode to assist in cabin heating. In this way, the electrically operated heater and heat pump can both provide cabin heating, facilitating rapid cabin warming. However, in other examples, the electrically operated heater may not be operated during the heating mode. It will therefore be understood, that the heating mode may be conceptually divided into sub-modes, a first sub-mode where the electrically operated heater and the heat pump circuit are operated in conjunction to provide heat to the vehicle cabin and a second sub-mode where electric heating of the cabin is reduced (e.g., phased out) and the heat pump circuit efficiently provides vehicle cabin heating. For example, in the second sub-mode, electric heater operation may be discontinued.

Furthermore, when operating in the heating mode a modeled pressure at a location downstream of the exterior heat exchanger may be used to control operation of the heat pump circuit 204 (e.g., the compressor). For example, a temperature at the location indicated at 276 may be modeled. The modeled temperature may then be used to control components in the compressor 228, for example, to alter the amount of heat transferred from the heat pump to the cabin heating circuit through the first refrigerant to coolant heat exchanger 226 (e.g., water cooled condenser). Modeling the temperature at the location between the first refrigerant to coolant heat exchanger 226 (e.g., water cooled condenser) and the electrically operated heater 214 enables a temperature sensor, formerly at or near location 276, to be omitted from the system, if desired. As a result, the cost of the system may be decreased. Furthermore, modeling the temperature at the location 276 may allow for more accurate control of the heat pump system, thereby increasing customer satisfaction. Modeling the temperature in the cabin heating circuit, is described in greater detail herein with regard to FIG. 4.

FIG. 3 shows a cooling mode of operation for the climate control system 200. In the cooling mode temperature reduced refrigerant (e.g., subcool) is transferred to the evaporator 232 from the first expansion valve 234 (e.g., cooling expansion valve), indicated via arrow 300. It will be understood that the valve 289 may be closed or partially closed during the cooling mode of operation to prevent refrigerant bypass flow through the conduit 291. The evaporator 232 may be used to cool air provided to the vehicle cabin 212, indicated via arrow 301. In this way, the heat pump's evaporator functions as a cooling core provided conditioned air to the cabin. Refrigerant is provided to the first expansion valve 234 from the exterior heat exchanger 236, indicated via arrow 302. Additionally, refrigerant is provided to the exterior heat exchanger 236 from the expansion valve 238, indicated via arrow 304. In the cooling mode heat is expelled from the exterior heat exchanger 236 to the surrounding environment. Thus, in the cooling mode the exterior heat exchanger functions as a condenser. Additionally, in the system's cooling mode refrigerant is provided to the first refrigerant to coolant heat exchanger 226 from the compressor 228, indicated via arrow 306. In the depicted example, the cabin heating circuit 202 remains inactive during cabin cooling. Therefore, the first refrigerant to coolant heat exchanger 226 does not transfer a substantial amount of heat to the cabin heating circuit 202. Additionally, in the cooling mode refrigerant is flowed from the evaporator 232 to the accumulator 230 for the compressor 228, as indicated via arrow 308.

To control the heat pump during the cooling mode a pressure may be modeled at location 276, downstream of the exterior heat exchanger 236. Furthermore, the modeled pressure may be used to control operation of the first expansion valve 234 (e.g., cooling expansion valve) to adjust the amount of refrigerant traveling through the evaporator 232. In this way, cabin cooling may be accurately controlled to provide a desired amount of cooling to the vehicle cabin. Various techniques for modeling the pressure in the cooling mode are discussed in greater detail herein with regard to FIGS. 4-6. Additionally, it will also be understood, in some example, the cooling mode the heat pump circuit may be substantially shut-down (e.g., not delivering heated coolant to the cabin heat exchanger).

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. Further still, an element shown within another element or shown outside of another element may be referred as such, in one example. Furthermore, elements positioned upstream and downstream to one another with regard to fluid flow may be referred to as such. Additionally, component in fluid circuits, loops, etc., may have at least one inlet and at least one outlet to allow the working fluid to flow through the components and therefore these features of the components may be referred to as such.

FIG. 4 shows a method 400 for operating a climate control system. It will be appreciated that method 400 may be implemented via the climate control system 200, illustrated in FIGS. 2 and 3 or, in other examples, may be implemented by other suitable climate control system. Instructions for carrying out method 400 and the rest of the methods described herein may be executed by a controller based on instructions stored in memory (e.g., non-transitory) of the controller and in conjunction with signals received from sensors of climate control system, such as the sensors described above with regard to FIGS. 2 and 3. It will also be understood that the method steps may include the controller sending command signals to actuators in the commanded component, the command triggering actuators in the commanded component to adjust the component, as desired.

At 402 the method includes determining operating conditions in the climate control system. The operating conditions may include temperatures and pressures in the climate control system sampled from sensors, for example. The operating conditions may further include ambient temperature, humidity, etc., that may be gathered via sensors. Additionally, the operating conditions may include vehicle cabin heating and/or cooling requests (e.g., desired temperature set-point, desired heating level, desired cooling level, etc.) received by the controller responsive to user (e.g., driver, passenger, etc.) interaction with an input device (e.g., user interface, voice command interface, climate control knobs, sliders, etc.) For instance, a user may interact with the input device to request a desired cabin temperature (e.g., 70°, 75°, 80°, etc.) a level of cabin heating or cooling (e.g., a high cabin heating, low cabin heating, high cabin cooling, medium cabin cooling, 90% heating, 10% cooling, etc.), etc.

Next at 404, the method determines if the climate control system is slated to be operated in a heating or cooling mode. Such a determination may be carried out, in one example, by determining if a cabin heating or cooling request, indicating a desire for cabin climate control, has been received. In other examples, the cabin heating mode may be selected when it is determined that the cabin temperature is less than a desired value. On the other hand, in such an example, the cabin cooling mode may be selected when it is determined that the cabin temperature is greater than the desired value.

If it is determined that the system slated to be operated in a heating mode, the method advances to 406. More generally, the heating mode may include steps 406-424. Furthermore, the heating mode and corresponding steps may be implemented while a heating request is being received and/or the vehicle cabin temperature is below a target value.

At 406 the method includes operating an electrically operated heater (e.g., PTC heater) to heat a vehicle cabin. For instance, an electrically operated heater may receive electric energy from the energy storage device and heat coolant delivered to a cabin heat exchanger (e.g., heater core). To elaborate, the output of the electrically operated heater may be adjusted using data from a temperature sensor coupled to a coolant conduit downstream of the electrically operated heater and upstream of the cabin heat exchanger for feedback heater control. For instance, a temperature set-point, range, etc., may be established, if the measured temperature drops below the set-point the output of the electrically operated heater may be increased. Conversely, if the measured temperature is above the set-point the output of the electrically operated heater may be decreased.

Next at 408 the method includes sampling or otherwise gathering data from a temperature sensor downstream of the electrically operated heater and upstream of the cabin heat exchanger (e.g., at the outlet of the electrically operated heater).

Next at 410 the method includes modeling a temperature downstream of the first refrigerant to coolant heat exchanger (e.g., water cooled condenser) and upstream of the electrically operated heater in the cabin heating circuit.

Modeling the temperature may include steps 412 and 414. At 412 the method includes determining a calibrated temperature table. The calibrated table may be calculated using the temperature from the sensor downstream of the electrically operated heater, the output (e.g., power, duty cycle, etc.) of the electrically operated heater, and the speed (e.g., duty cycle) of the coolant pump in the cabin heating loop. The calibratable table may be a function of refrigerant to coolant heating efficiency (based on compressor speed and pressure) and the temperature of coolant entering the refrigerant to coolant heat exchanger 226. The temperature of the coolant entering the refrigerant to coolant heat exchanger 226 may be a function of coolant into the heater core and blower speed of cabin.

Next at 414, the method includes comparing a measured temperature against the calibrated temperature table to determine the modeled temperature at the location downstream of the first refrigerant to coolant heat exchanger and upstream of the electrically operated heater. For instance, the modeled temperature may be determined by subtracting a value from the calibrated table from the temperature sampled from the temperature sensor downstream of the electrically operated heater. In this way, the modeled temperature may be efficiently ascertained.

At 416 the method includes operating the heat pump circuit based on the modeled temperature. Operating the heat pump circuit may include step 418. At step 418, the method includes initiating heat pump feedback control using the modeled temperature. For example, the output of the compressor in the heat pump circuit may be increased or decreased when the modeled temperature falls below or surpasses, respectively, a set-point value. In one specific example, the compressor may be operated using proportional-integral-derivative (PID) control. For instance, during PID control, the controller may calculate an error valve representing the difference between a desired set-point temperature and the modeled temperature. Subsequently, the correction may be applied to proportional, integral, and derivative terms. However, numerous suitable control schemes (e.g., feedback control schemes) of the compressor and other components in the heat pump system may be employed.

It will also be understood, that both heat pump circuit feedback control using the modeled temperature and feedback control of the electrically operated heater using the temperature sensor may be carried out in conjunction to achieve a desired heater core temperature. For instance, if the output of the compressor has reached an upper limit and the heater core has not achieved a desired temperature the output of the electrically operated heater may be increased to enable the desired heater core temperature to be quickly achieved. In one example, PTC heater control may be based on target vs actual heater core temperature. In such an example, the target heater core temperature may be sent from the climate control head based on driver input. Consequently, customer satisfaction can be increased.

At 420 the method includes determining if the cabin heat exchanger (e.g., heater core) is at a desired temperature set-point. If it is determined that the cabin heat exchanger is not at the desired temperature set-point (NO at 420), the method moves to 422. At 422 the method includes maintaining current operating mode. For example, the current operating mode may be a first sub-mode of cabin heating where the heat pump circuit is operated using feedback control with the modeled temperature and the electrically operated heater is controlled via the feedback control strategy using the temperature sensor input. Thus, in the first sub-mode cabin heating occurs using the heat pump and the electrically operated heater in tandem. It will be understood that steps 406-418 may be included in a first sub-mode of the system's heating mode. After 422 the method may return to 420. However, in other examples, the method may return to 406 subsequent to 422 or may end after 422.

On the other hand, if it is determined that the cabin heat exchanger has reached the temperature set-point (YES at 420) the method advances to 424. At 424, the method includes decreasing cabin heating via electrically operated heater. For instance, cabin heating via the electrically operated heater may be phased out, discontinued, etc.

At 426, the method includes maintaining feedback control of heat pump circuit using the modeled temperature. In this way, heat pump circuit feedback control may be maintained to keep the cabin temperature at the desired level, within a desired range, etc., when the output of the electrically operated heater is decreased or discontinued. The cabin may, consequently, be quickly heated using the heat pump and the electric heater and then the electric heater may be phased out, allowing for a more efficient heat pump cycle to be used for cabin heating. Consequently, the system conserves energy enabling the vehicle's range to be extended in the case of a plug-in vehicle (e.g., BEV).

It will be understood that steps 424-426 may be included in a second sub-mode of cabin heating operation. Furthermore, it will be appreciated that the system may transition between the first sub-mode of cabin heating and the second sub-mode of cabin heating or vice versa using a comparison between a cabin heating set-point and an actual vehicle cabin temperature. Additionally or alternatively, the first and second sub-modes may be transitioned between based on state of charge of the energy storage device. For instance, the second sub-mode may be selected when the energy storage device state of charge falls below a threshold value (e.g., 20 Amp-Hours, 50 Amp-Hours, 100 Amp-Hours, etc.).

If a cooling mode is selected at 404 the method proceeds to 428. It will be understood that in method 400 the heating mode occurs while the cooling mode does not and vice versa. Furthermore, the modes may be transitioned between depending on changes in operating conditions (e.g., when different sets of entry conditions are satisfied). For instance, the heating mode may be entered into when a cabin heating request is received and the cooling mode may be entered into when a cabin cooling request is received. However, in other examples the modal transition may occur automatically responsive to changes in coolant and/or refrigerant temperatures in the system, ambient temperatures, etc. Therefore, the controller may differentiate between the heating and cooling modes in some instances. The different actions in the modes may be implemented while the entry conditions are occurring as well as other conditions triggering specific actions in the modes. It will also be understood that the sub-modes, discussed herein, may also be transitioned between in a similar manner, in some instances.

At 428, the method includes sampling or otherwise collecting data from a pressure sensor at an inlet and/or outlet of the first refrigerant to coolant heat exchanger (e.g., water cooled condenser).

Next at 430, the method includes modeling a pressure downstream of the exterior heat exchanger and upstream of the first expansion valve (e.g., cooling expansion valve). Modeling the pressure may include steps 432-434. At 432, the method includes determining a calibrated pressure drop table. The calibrated pressure drop indicates the pressure drop across the exterior heat exchanger and therefore allows the pressure at the outlet of the exterior heat exchanger to be determined when the pressure and/or temperature of refrigerant upstream of the exterior heat exchanger is known. The calibrate pressure drop table may be determined using, for example, compressor speed, the pressure of the refrigerant upstream of exterior heat exchanger (e.g., at a location between the second expansion valve and the first refrigerant to coolant heat exchanger), and/or ambient temperature. Specifically, in one example, the pressure drop may be generated using a table based on pressure upstream of the heat exchanger, ambient temperature, and airflow across the heat exchanger. It will be understood that the airflow across the heat exchanger may be a function of vehicle speed and fan speed.

At 434, the method includes determining the modeled pressure using the pressure drop table and the sampled pressure (e.g., a pressure from the pressure sensor upstream of the exterior heat exchanger between the second expansion valve and the first refrigerant to coolant heat exchanger).

Next at 436 the method includes determining a subcool value from the modeled pressure and a temperature from a sensor downstream of the exterior heat exchanger, such as at the outlet of the exterior heat exchanger. To elaborate, the subcool may specifically be calculated by first converting the pressure at the outlet of the exterior heat exchanger to a condensing temperature and then subtracting the temperature at the outlet of the exterior heat exchanger from the condensing temperature, in one example. However, in other examples step 436 may be omitted from the method.

At 438 the method includes operating the heat pump circuit based on the modeled pressure. Operating the heat pump may include step 440. At 440, the method includes initiating a heat pump feedback control strategy using the modeled pressure. Specifically, in one example, the heat pump circuit may be operated based on the subcool value. For example, if the subcool value is above a targeted set-point, ascertained from a cabin cooling request, the first expansion valve (e.g., cooling expansion valve) may be closed to a greater extent. On the other hand, if the subcool value is below the targeted set-point, the first expansion valve may be opened to a greater extent. In this way, the degree of opening/closing of the first expansion valve may be adjusted to allow the evaporator to provide a desired amount of cooling to the vehicle cabin, for example. It will be understood, that in other examples, the compressor speed and/or degree of opening of the heating expansion valve may also be operated based on the subcool value.

FIGS. 5 and 6 show graphical embodiments 500 and 600 of the heating and cooling modes, respectively, of the climate control system. In each graph time is indicated on the abscissa.

In FIG. 5, plot 502 indicates the operational state (i.e., an "ON" and "OFF" state) of the heating mode. As shown, the heating mode is on from t0 to t2. Virtual temperature and compressor output are also indicated on ordinates in graphs depicted in FIG. 5. Plot 504 indicates the virtual temperature modeled using the previously described technique. A virtual temperature set-point is indicated at 506. As shown, the compressor output is varied to bring the virtual temperature in-line with the virtual temperature set-point. In this way, compressor feedback control using the virtual temperature can be implemented.

In FIG. 6 plot 602 indicates the operational state (i.e., an "ON" and "OFF" state) of the cooling mode. As shown, the cooling mode is on from t0 to t2. Subcool value and cooling expansion valve position and compressor output are also indicated on ordinates in graphs in FIG. 6. Plot 604 indicates a subcool value and a subcool set-point is indicated at 606. Plot 608 indicates expansion valve position. As previously discussed, the subcool may be calculated using a temperature and pressure at the outlet of the exterior heat exchanger. As shown, the position of the expansion valve is adjusted to move the subcool value towards the set-point 606.

The technical effect of modeling a temperature and/or a pressure in a climate control system and then using the modeled values to control the system is to decrease system costs by reducing the number of sensors used therein, if desired, as well as a potential increase in the accuracy of cabin heating and cooling control in the system. Another technical effect of modeling the pressure and/or temperature in the climate control system may be to lower energy usage of the system which may result in increasing vehicle range when the vehicle is a plug-in vehicle (e.g., BEV).

The invention is further described in the following paragraphs. In one example, a method for operating a vehicle climate control system is provided that comprises: modeling a temperature in a cabin heating circuit coupled to a heat pump circuit via a refrigerant to coolant heat exchanger configured to transfer thermal energy between the heat pump circuit and the cabin heating circuit; and operating the heat pump circuit to deliver thermal energy to a cabin heat exchanger based on the modeled temperature. In one example, the method may further comprise, prior to operating the heat pump circuit, operating an electrically operated heater positioned downstream of the refrigerant to coolant heat exchanger to deliver thermal energy to the cabin heat exchanger. In another example, the method may further comprise decreasing an output of the electrically operated heater responsive to the vehicle cabin achieving a target temperature while the heat pump circuit continues to operate to deliver thermal energy to the cabin heat exchanger to maintain the target temperature.

In another aspect, a vehicle system is provided that comprises: an energy storage device configured to deliver energy to an electric motor configured to deliver motive power to a drive wheel; a cabin heating circuit including: a cabin heat exchanger positioned downstream of a refrigerant to coolant heat exchanger in a heat pump circuit, the refrigerant to coolant heat exchanger transferring heat between a heat pump circuit in the heat pump circuit and the cabin heating circuit, where the heat pump circuit is configured to receive energy from the energy storage device; and an electrically operated heater positioned between the refrigerant to coolant heat exchanger and the cabin heat exchanger; and a controller including instructions stored in memory that when executed cause the controller to: model a temperature at a location between the refrigerant to coolant heat exchanger and the electrically operated heater; and operate the heat pump circuit to deliver thermal energy to the cabin heat exchanger using the modeled temperature.

In another aspect, a method for operating a climate control system in a vehicle is provided that comprises: modeling a temperature at a location between a refrigerant to coolant heat exchanger and an electrically operated heater fluidly connected to a cabin heat exchanger; operating the climate control system in a first mode responsive to a temperature of a vehicle cabin being below a threshold value, in the first mode a compressor in a heat pump circuit is operated based on the modeled temperature and the electrically operated heater is operated based on a temperature sensor downstream of the electrically operated heater and upstream of the cabin heat exchanger to increase the temperature of the vehicle cabin; and operating the climate control system in a second mode responsive to the temperature of the vehicle cabin being at the threshold value, in the second mode operation of the electrically operated heater is discontinued. In one example, the method may further comprise transitioning to from the first mode to the second mode when the temperature of the vehicle cabin reaches the threshold value where transitioning from the first mode into the second mode includes decreasing an output of the electrically operated heater.

In another aspect, a method for operating a vehicle climate control system is provided that comprises: modeling a pressure in a heat pump circuit downstream of an exterior heat exchanger and upstream of a cooling expansion valve based on a pressure from a pressure sensor positioned between a heating expansion valve and downstream of a water cooled condenser in the vehicle heat pump system; and in a cooling mode, adjusting an output of a cooling expansion valve in the heat pump circuit to cool a vehicle cabin based on the modeled pressure and a temperature from a sensor positioned upstream of the cooling expansion valve and downstream of the exterior heat exchanger. In one example, the method may further comprise transitioning into the cooling mode from a heating mode of the vehicle climate control system responsive to receiving a cabin climate control adjustment request. In another example, the method may further comprise operating a compressor in the heat pump circuit based on the modeled pressure. In yet another example, the method may further comprise operating a heating expansion valve in the heat pump circuit based on the modeled pressure.

In another aspect, a vehicle system is provided that comprises: an energy storage device configured to transfer energy to an electric motor configured to transfer motive power to a drive wheel; a cabin heating circuit including: a cabin heat exchanger positioned downstream of a refrigerant to coolant heat exchanger in a heat pump circuit, the refrigerant to coolant heat exchanger transferring heat between a heat pump circuit in the heat pump circuit and the cabin heating circuit, where the heat pump circuit is configured to receive energy from the energy storage device; and an electrically operated heater positioned between the refrigerant to coolant heat exchanger and the cabin heat exchanger; and a controller including instructions stored in memory that when executed cause the controller to: model a pressure in a heat pump circuit downstream of an exterior heat exchanger and upstream of a cooling expansion valve; and in a cooling mode, operate the cooling expansion valve in the heat pump circuit to cool a vehicle cabin and/or a vehicle battery based on the modeled pressure and a temperature from a temperature sensor positioned upstream of the cooling expansion valve and downstream of the exterior heat exchanger.

In another aspect, a method for operating a vehicle climate control system is provided that comprises: modeling a pressure in a heat pump circuit downstream of an exterior heat exchanger an upstream of an expansion valve; and operating the expansion valve in the heat pump circuit to cool a vehicle cabin based on the modeled pressure and a temperature from a sensor positioned upstream of the expansion valve and downstream of the exterior heat exchanger. In one example, the method may further comprise operating a compressor in the heat pump circuit based on the modeled pressure.

In any of the aspects or combinations of the aspects, the temperature may be modeled at an outlet of the refrigerant to coolant heat exchanger.

In any of the aspects or combinations of the aspects, the electrically operated heater may be operated based on temperature data from a temperature sensor coupled to a conduit extending between the electrically operated heater and the cabin heat exchanger. In any of the aspects or combinations of the aspects, modeling the temperature may include determining a difference between a temperature from a temperature sensor at an inlet of the cabin heat exchanger and a calibrated value.

In any of the aspects or combinations of the aspects, the calibrated value may be determined based on the temperature from the temperature sensor, control commands of an electrically operated heater positioned between the refrigerant to coolant heat exchanger and the cabin heat exchanger in the cabin heating circuit, and control commands of a pump in the cabin heating circuit.

In any of the aspects or combinations of the aspects, operating the heat pump circuit may include adjusting operation of a compressor in the heat pump circuit using a feedback control strategy.

In any of the aspects or combinations of the aspects, adjusting operation of the compressor may include implementing proportional-integral-derivative (PID) control of the compressor using the modeled temperature.

In any of the aspects or combinations of the aspects, operating the heat pump circuit may include directing refrigerant from a compressor to the refrigerant to coolant heat exchanger and from the refrigerant to coolant heat exchanger to an expansion valve and where the compressor increases a pressure of the refrigerant flowing there through and the expansion valve decreases the pressure of the refrigerant flowing there through.

In any of the aspects or combinations of the aspects, the controller may further comprise instructions stored in the memory that when executed cause the controller to: operate the electrically operated heater to deliver thermal energy to the cabin heat exchanger in conjunction with the operation of the heat pump circuit to achieve a cabin temperature set-point.

In any of the aspects or combinations of the aspects, the controller may further comprise instructions stored in the memory that when executed cause the controller to: decrease an output of the electrically operated heater while maintaining operation of the heat pump to sustain the cabin temperature set-point in a vehicle cabin in response to achieving the cabin temperature set-point.

In any of the aspects or combinations of the aspects, modeling the temperature may include determining a difference between a temperature from a temperature sensor at an inlet of the cabin heat exchanger and a calibrated value and where the calibrated value is determined based on the temperature from the temperature sensor, control commands of an electrically operated heater positioned between the refrigerant to coolant heat exchanger and the cabin heat exchanger in the cabin heating circuit, and control commands of a pump in the cabin heating circuit.

In any of the aspects or combinations of the aspects, the refrigerant to coolant heat exchanger may be a water cooled condenser.

In any of the aspects or combinations of the aspects, the vehicle may be a hybrid vehicle including an internal combustion engine.

In any of the aspects or combinations of the aspects, modeling the temperature may include determining a difference between a temperature from a temperature sensor at an inlet of the cabin heat exchanger and a calibrated value.

In any of the aspects or combinations of the aspects, the calibrated value may be determined based on the temperature from the temperature sensor, control commands of an electrically operated heater positioned between the refrigerant to coolant heat exchanger and the cabin heat exchanger in the cabin heating circuit, and control commands of a pump in the cabin heating circuit.

In any of the aspects or combinations of the aspects, modeling the pressure in the heat pump circuit may include determining a pressure drop across the exterior heat exchanger using a pressure from a pressure sensor positioned upstream of the exterior heat exchanger, a speed of a compressor in the heat pump circuit, and/or an ambient temperature.

In any of the aspects or combinations of the aspects, the refrigerant to coolant heat exchanger may be a water cooled condenser coupled to a cabin heating circuit and the cabin heating circuit is shut-down during operation of the expansion valve.

In any of the aspects or combinations of the aspects, operating the expansion valve in the heat pump circuit may occur in a cooling mode of the vehicle climate control system and where the method further comprises transitioning the vehicle climate control system into the cooling mode from a heating mode responsive to receiving a cabin climate control adjustment request.

In any of the aspects or combinations of the aspects, operating the expansion valve may include increasing or decreasing a degree of opening of the expansion valve to increase or decrease an amount of refrigerant delivered to an evaporator.

In any of the aspects or combinations of the aspects, the expansion valve may be a cooling expansion valve and where operating the cooling expansion valve in the heat pump circuit to cool the vehicle cabin includes operating the cooling expansion valve using a subcool value determined using the modeled pressure and a temperature from a temperature sensor downstream of the exterior heat exchanger.

In any of the aspects or combinations of the aspects, modeling the pressure in the heat pump circuit may include determining a pressure drop across the exterior heat exchanger using a pressure from a pressure sensor positioned directly downstream or upstream of a refrigerant to coolant heat exchanger and where the cabin heating circuit coupled to the refrigerant to coolant heat exchanger is shut-down during operation of the cooling expansion valve.

In any of the aspects or combinations of the aspects, the controller may further comprise instructions stored in the memory that when executed cause the controller to: transition between a heating mode of the vehicle system to the cooling mode responsive to receiving a cabin climate control adjustment request.

In any of the aspects or combinations of the aspects, the refrigerant to coolant heat exchanger is a water cooled condenser.

In any of the aspects or combinations of the aspects, the vehicle may be a hybrid vehicle including an internal combustion engine.

In any of the aspects or combinations of the aspects, the vehicle may be a battery electric vehicle.

In any of the aspects or combinations of the aspects, the water cooled condenser may be coupled to the heat pump circuit and a cabin heating circuit and where the cabin heating circuit is shut-down while the pressure in the heat pump circuit is modeled.

In any of the aspects or combinations of the aspects, in the cooling mode refrigerant may be transferred from the cooling expansion valve directly to an evaporator.

In any of the aspects or combinations of the aspects, operating the cooling expansion valve in the heat pump circuit to cool the vehicle cabin may include operating the cooling expansion valve using a subcool value determined using the modeled pressure and a temperature from a temperature sensor downstream of the exterior heat exchanger.

In another representation, a method for vehicle climate system control is provided that includes calculating an outlet temperature of a water cooled condenser providing heat transfer functionality between a cabin heating loop and a heat pump loop without the use of a temperature sensor at the outlet and using the calculated outlet temperature to adjust a compressor in the heat pump loop to achieve a desired vehicle cabin temperature.

In yet another representation, a method for vehicle climate system control is provided that includes calculating a pressure at an outlet of an exterior heat exchanger functioning as a condenser in a heat pump loop without the use of a pressure sensor at the outlet of the exterior heat exchanger and controlling operation of a cooling expansion valve positioned downstream of the exterior heat exchanger using the calculated pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle climate control system, comprising: a controller, modeling a pressure in a heat pump circuit downstream of an exterior heat exchanger and upstream of an expansion valve; and operating the expansion valve in the heat pump circuit to cool a vehicle cabin based on the modeled pressure and a temperature from a sensor positioned upstream of the expansion valve and downstream of the exterior heat exchanger; wherein modeling the pressure in the heat pump circuit includes determining a pressure drop across the exterior heat exchanger using a pressure from a pressure sensor positioned upstream of the exterior heat exchanger, a speed of a compressor in the heat pump circuit, and/or an ambient temperature.

2. The method of claim 1, further comprising a refrigerant to coolant heat exchanger coupled to a cabin heating circuit and wherein the cabin heating circuit is shut-down during operation of the expansion valve.

3. The method of claim 1, wherein operating the expansion valve in the heat pump circuit occurs in a cooling mode of the vehicle climate control system and wherein the method further comprises transitioning the vehicle climate control system into the cooling mode from a heating mode responsive to receiving a cabin climate control adjustment request.

4. The method of claim 1, wherein operating the expansion valve includes increasing or decreasing a degree of opening of the expansion valve to increase or decrease an amount of refrigerant delivered to an evaporator.

5. The method of claim 1, further comprising operating the compressor in the heat pump circuit based on the modeled pressure.

6. The method of claim 1, wherein the expansion valve is a cooling expansion valve and wherein operating the cooling expansion valve in the heat pump circuit to cool the vehicle cabin includes operating the cooling expansion valve using a subcool value determined using the modeled pressure and a temperature from a temperature sensor downstream of the exterior heat exchanger.

7. A vehicle system comprising:
an energy storage device configured to transfer energy to an electric motor configured to transfer motive power to a drive wheel;
a cabin heating circuit including:
a cabin heat exchanger positioned downstream of a refrigerant to coolant heat exchanger in a heat pump circuit, the refrigerant to coolant heat exchanger transferring heat between a heat pump in the heat pump circuit and the cabin heating circuit, wherein the heat pump circuit is configured to receive energy from the energy storage device; and
an electrically operated heater positioned between the refrigerant to coolant heat exchanger and the cabin heat exchanger; and
a controller including instructions stored in memory that when executed cause the controller to:
model a pressure in the heat pump circuit downstream of an exterior heat exchanger and upstream of a cooling expansion valve; and
in a cooling mode, operate the cooling expansion valve in the heat pump circuit to cool a vehicle cabin and/or a vehicle battery based on the modeled pressure and a temperature from a temperature sensor positioned upstream of the cooling expansion valve and downstream of the exterior heat exchanger.

8. The vehicle system of claim 7, wherein modeling the pressure in the heat pump circuit includes determining a pressure drop across the exterior heat exchanger using a pressure from a pressure sensor positioned directly downstream or upstream of the refrigerant to coolant heat exchanger and wherein the cabin heating circuit coupled to the refrigerant to coolant heat exchanger is shut-down during operation of the cooling expansion valve.

9. The vehicle system of claim 7, wherein the controller further comprises instructions stored in the memory that when executed cause the controller to:
transition between a heating mode of the vehicle system to the cooling mode responsive to receiving a cabin climate control adjustment request.

10. The vehicle system of claim 7, wherein the refrigerant to coolant heat exchanger is a water cooled condenser.

11. The vehicle system of claim 7, wherein the vehicle system is included in a hybrid vehicle that includes an internal combustion engine.

12. The vehicle system of claim 7, wherein the vehicle system is included in a battery electric vehicle.

13. A method for operating a vehicle climate control system, comprising: a controller, modeling a pressure in a heat pump circuit downstream of an exterior heat exchanger and upstream of a cooling expansion valve based on a pressure from a pressure sensor positioned between a heating expansion valve and downstream of a water cooled condenser in the vehicle heat pump system; and in a cooling mode, adjusting an output of a cooling expansion valve the heat pump circuit to cool a vehicle cabin based on the modeled pressure and a temperature from a sensor positioned upstream of the cooling expansion valve and downstream of the exterior heat exchanger.

14. The method of claim 13, wherein the water cooled condenser is coupled to the heat pump circuit and a cabin heating circuit and wherein the cabin heating circuit is shut-down while the pressure in the heat pump circuit is modeled.

15. The method of claim 13, further comprising transitioning into the cooling mode from a heating mode of the vehicle climate control system responsive to receiving a cabin climate control adjustment request.

16. The method of claim 13, wherein in the cooling mode, refrigerant is transferred from the cooling expansion valve directly to an evaporator.

17. The method of claim 13, wherein operating the cooling expansion valve in the heat pump circuit to cool the vehicle cabin includes operating the cooling expansion valve using a subcool value determined using the modeled pressure and a temperature from a temperature sensor downstream of the exterior heat exchanger.

18. The method of claim 13, further comprising operating a compressor in the heat pump circuit based on the modeled pressure.

19. The method of claim 13, further comprising operating a heating expansion valve in the heat pump circuit based on the modeled pressure.

* * * * *